(12) United States Patent
Imai et al.

(10) Patent No.: US 8,517,147 B2
(45) Date of Patent: Aug. 27, 2013

(54) LUBRICATING SYSTEM FOR GEAR TRAIN

(75) Inventors: Hideyuki Imai, Akashi (JP); Tatsuhiko Goi, Kobe (JP); Hidenori Arisawa, Kakogawa (JP); Motohiko Nishimura, Matsudo (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 290 days.

(21) Appl. No.: 12/591,890

(22) Filed: Dec. 3, 2009

(65) Prior Publication Data

US 2010/0140019 A1   Jun. 10, 2010

(30) Foreign Application Priority Data

Dec. 5, 2008   (JP) ................................ 2008-310705

(51) Int. Cl.
*F16H 57/04* (2010.01)
(52) U.S. Cl.
USPC ...................................................... 184/6.12
(58) Field of Classification Search
USPC ............... 184/6.12, 11.1, 14, 15.2, 15.3, 26, 184/27.1, 43, 59
See application file for complete search history.

(56) References Cited

U.S. PATENT DOCUMENTS

| | | | | |
|---|---|---|---|---|
| 3,162,269 A | * | 12/1964 | Reed ............................ | 184/6.12 |
| 3,647,024 A | * | 3/1972 | Wick et al. ................... | 184/6.18 |
| 3,788,426 A | * | 1/1974 | Hull, Jr. ....................... | 184/109 |
| 3,931,783 A | * | 1/1976 | Croisant ....................... | 440/75 |
| 4,470,324 A | * | 9/1984 | Renk et al. ................... | 74/606 R |
| 4,667,774 A | * | 5/1987 | Roberge ....................... | 184/6.12 |
| 5,189,929 A | * | 3/1993 | Chory ........................... | 74/606 A |
| 7,963,186 B2 | * | 6/2011 | Hayes et al. .................. | 74/467 |
| 7,971,507 B2 | * | 7/2011 | Swainson ..................... | 74/606 R |
| 8,021,259 B2 | * | 9/2011 | Hilker et al. ................... | 475/160 |

FOREIGN PATENT DOCUMENTS

| | | |
|---|---|---|
| EP | 1 610 036 A2 | 12/2005 |
| FR | 2.074.898 | 10/1971 |
| GB | 2 223 819 A | 4/1990 |
| JP | U-58-177692 | 11/1983 |
| JP | A-4-503558 | 6/1992 |
| JP | A-2008-25832 | 2/2008 |
| WO | WO 91/05965 A1 | 5/1991 |

OTHER PUBLICATIONS

European Search Report for corresponding European Patent Application No. 09178086.6, mailed Dec. 28, 2010.
Office Action issued in Japanese Patent Application No. 2008-310705 dated Oct. 19, 2010 (with translation).

* cited by examiner

*Primary Examiner* — William E Dondero
*Assistant Examiner* — Mark K Buse
(74) *Attorney, Agent, or Firm* — Oliff & Berridge, PLC (57) ABSTRACT

This invention provides a lubricating system for a gear train including: a lubricating oil supply port configured to supply a lubricating oil in a direction vertical to both axes of a pair of gears and toward a mesh point at which the pair of gears are meshed with each other; a shroud configured to cover at least teeth of the pair of gears so as to form a flow passage of the lubricating oil between the pair of gears and the shroud; and a pair of discharge ports respectively configured to discharge the lubricating oil from the flow passage. The pair of discharge ports are respectively positioned at two portions of the shroud respectively opposed to the mesh point across respective axes of the pair of gears.

7 Claims, 6 Drawing Sheets

LUBRICATING SYSTEM FOR GEAR TRAIN

CROSS REFERENCE TO RELATED APPLICATIONS

This application is based upon the prior Japanese Patent Application No. 2008-310705 filed on Dec. 5, 2008, the entire contents of which are incorporated herein by reference.

BACKGROUND OF THE INVENTION

1. Field of the Invention

The present invention relates to a lubricating system for a gear train provided in a gear unit, such as a gear box, a high-speed gear mechanism or the like, used in a gas-turbine engine or jet engine.

2. Background Art

The gear unit of this type has a lubricating oil supply port provided for spraying lubricating oil toward each gear in order to lubricate and cool the gear, and a lubricating oil discharge port provided for recovering the lubricating oil remaining after a lubricating and cooling operation, with an oil-discharge pump. As the loss of power generated in this gear unit, one caused by air resistance associated with rotation of each gear and another caused by resistance associated with stirring the lubricating oil are mainly known. Especially, in the case of an aircraft engine, the gear train is rotated at a relatively high speed, generating considerably increased air resistance. Additionally, with recent conspicuous acceleration of introducing various electric and electronic equipment or units into the body of each aircraft, it can be expected that dramatic increase of the capacity of power generation will be required in the near future. Of course, in such a case, the loss of power due to the air resistance generated by the rotation of each gear and/or resistance associated with stirring the lubricating oil will also be increased. This may significantly increase negative impact on the fuel consumption of the aircraft engine, such as the jet engine, gas-turbine engine or the like.

To reduce the aforementioned loss of power in the gear unit, a gear shroud system, in which a plurality of gears, respectively meshed with one another in the gear train, are covered with a shroud, has been proposed (see Patent Document 1: JP4-503558A). This shroud system is intended to reduce the air resistance by controlling or positively suppressing generation of a reverse-tornado-shaped spiral air flow that would be otherwise likely to be drawn along a front face of each rotated gear and then generated on a front face side of the gear. Specifically, the shroud of this system includes a pair of side walls, each opposed to a side face of each gear, while extending adjacent an outer diametrical face of the gear, and an end wall arranged to be vertical to the pair of side walls, while extending parallel to the front face of each gear. In other words, these side walls and end wall are respectively arranged to surround each front face of the plurality of gears in the gear train. In addition, a first opening for injecting the lubricating oil toward each gear and a second opening for discharging the lubricating oil from the shroud are provided in the end wall, respectively. Namely, with this shroud system provided adjacent to the teeth of each gear, the generation of the aforementioned spiral air flow on the front face side of each gear can be positively controlled. Therefore, the air resistance can be significantly reduced.

In order to effectively reduce the air resistance and resistance associated with stirring the lubricating oil, it is necessary that the above shroud covering the respective gears in the gear train has a shape suitable for smoothly introducing the lubricating oil into the discharge port without causing undue residence of the lubricating oil and then efficiently discharging the lubricating oil from the discharge port. If the discharge port is provided in an unsuitable position of the shroud, the residence of an excessive amount of the lubricating oil would occur in the shroud, leading to substantial increase of the loss of power, irrespectively of the provision of the shroud. It is true that the shroud disclosed in the Patent Document 1 can positively control the generation of the aforementioned spiral air flow. However, this technique is essentially aimed at enhancing the cooling effect of the lubricating oil by using the shroud. Namely, in this Patent Document 1, there is no study and/or suggestion for smoothly introducing the lubricating oil into the discharge port and efficiently discharging the oil from the discharge port.

SUMMARY OF THE INVENTION

Therefore, it is an object of this invention to provide a lubricating system for the gear train which can smoothly guide the lubricating oil toward the discharge port and efficiently discharge the lubricating oil from the discharge port, thereby effectively reducing both of the air resistance and resistance associated with stirring the lubricating oil, thus successfully controlling the loss of power.

To achieve the above object, the lubricating system for the gear train according to the present invention includes: a lubricating oil supply port configured to supply a lubricating oil in a direction vertical to both axes of a pair of gears and toward a mesh point at which the pair of gears are meshed with each other; a shroud configured to cover at least teeth of the pair of gears so as to form a flow passage of the lubricating oil between the pair of gears and the shroud; and a pair of discharge ports respectively configured to discharge the lubricating oil from the flow passage, the pair of discharge ports respectively being positioned at two portions of the shroud respectively opposed to the mesh point across respective axes of the pair of gears.

According to this lubricating system for the gear train, in the portions respectively opposed to the mesh point in the shroud across the axes of the two gears, the lubricating oil can be swirled at an appropriate speed along an inner face of the shroud, as well as the centrifugal force can be applied most effectively to such swirled lubricating oil. Therefore, even in the case in which the discharge ports respectively provided to such portions have a relatively small opening area that is advantageous for controlling the air resistance, the lubricating oil can be discharged in a preset discharge amount from each discharge port. Thus, the air resistance caused by the rotation of the gears can be securely reduced, as well as the increase of the resistance associated with stirring the lubricating oil, which would be otherwise caused by the undue residence of the lubricating oil in the shroud, can be successfully controlled.

In this invention, it is preferred that the pair of gears are bevel gears. The pair of discharge ports are respectively located in two positions respectively opposite to a pair of toothed portions of the pair of bevel gears in radially outward directions, each of the toothed portions including the teeth of each of the bevel gears and an annular rim of each of the bevel gears on which the teeth are formed.

Since the teeth of each bevel gear have a truncated-cone-like shape on the whole, the lubricating oil swirled with the rotation of each gear tends to be gathered around the toothed portion composed of the truncated-cone-like teeth and rim, while being subjected to an effect of the centrifugal force for swirling the lubricating oil. Therefore, the discharge ports, each provided to be opposed to the toothed portion radially from the outside, can serve to discharge the lubricating oil with high efficiency.

In this invention, it is preferred that when the pair of gears are bevel gears, respectively, the shroud includes a pair of end walls respectively covering a pair of front faces of the pair of gears, a pair of partially cylindrical walls respectively covering a pair of outer circumferential faces of the pair of toothed portions from radially outsides, and a pair of partially conical walls respectively covering distal ends of the teeth from obliquely radially outsides. The pair of discharge ports are respectively formed in the pair of partially cylindrical walls.

With the provision of the discharge ports to the partially cylindrical walls respectively covering the outer circumferential faces of the toothed portions radially from the outside, each discharge port can be provided in the position, in which the discharge port is opposed to the toothed portion radially from the outside and to which the centrifugal force for swirling the lubricating oil can be applied at the maximum effect. Therefore, the lubricating oil can be discharged more effectively.

In this invention, it is preferred that when the pair of gears are bevel gears, respectively, a width of each of the pair of discharge ports in an axial direction of each corresponding gear is substantially coincident with a height in the axial direction of each of the pair of partially cylindrical walls.

Therefore, the lubricating oil can be discharged efficiently from each discharge port provided over the entire height in the axial direction of each corresponding partially cylindrical wall.

In this invention, it is preferred that the pair of gears have horizontal axes, respectively, and the lubricating oil is supplied upward from below toward the mesh point.

With this configuration, a position below the mesh point of the pair of gears respectively having the horizontal axes, i.e., a rear side in the respective rotational directions of the two gears, is a side that will be subjected to a gear pump effect. Thus, the lubricating oil can be smoothly supplied toward the mesh point from the position below the mesh point. Therefore, as compared with the case in which the lubricating oil is supplied to the mesh point, while being injected in a direction parallel to each gear axis from each front face side of the two gears, the lubricating oil can be supplied to the teeth of each gear more efficiently in a greater amount.

In this invention, it is preferred that each of the pair of discharge ports is located in a position angularly spaced apart from the mesh point by approximately 180° about an axis of each corresponding gear, and a circumferential length of each of the pair of discharge ports corresponds to a circumferential angle of approximately 30° about the axis of each corresponding gear.

In the position of the above approximately 180°, the flow of the lubricating oil can be sufficiently regulated by the shroud, as well as can be swirled at the appropriate speed, while being subjected to the centrifugal force. Thus, even in the case in which each discharge port has such a relatively small opening area corresponding to the circumferential angle of approximately 30° that can control the air resistance, the lubricating oil can be smoothly discharged, in the preset discharge amount, from the discharge port. This can significantly reduce the resistance associated with stirring the lubricating oil. However, if each discharge port is provided in a position angularly spaced apart from the mesh point by an angle less than 180°, the flow of the lubricating oil would not be sufficiently regulated, resulting in a poor effect of discharging the lubricating oil. Contrary, if each discharge port is provided in a position angularly spaced apart from the mesh point by an angle greater than 180°, the residence time of the lubricating oil in the shroud would be unduly long, resulting in increase of the resistance associated with stirring the lubricating oil.

If the circumferential length of each discharge port is shorter than the length corresponding to the circumferential angle of 30°, the discharge amount of the lubricating oil would be reduced to be less than the preset amount, leading to the residence of the excessive amount of the lubricating oil in the shroud. Contrary, if the circumferential length of each discharge port is longer than the length corresponding to the circumferential angle of 30°, the air resistance would be unduly increased with the air flowed into the shroud from the discharge port.

In this invention, it is preferred that the shroud includes a pair of end walls respectively covering a pair of front faces of the pair of gears, and an inlet port for introducing an outside air into the shroud is formed in one of the pair of end walls at a position opposite to the front face of one gear having an outer diameter smaller than an outer diameter of an other gear.

Generally, in the case in which two gears having different diameters are provided in the gear train, the effect of the centrifugal force applied from the outer circumferential face of the gear having the smaller outer diameter is less than the effect applied from the gear having the larger outer diameter, thus reducing the pump effect so much. Therefore, such a smaller outer diameter of the gear renders the lubricating oil unlikely to be flowed along the inner face of the shroud, leading to a poor discharge effect of the lubricating oil from the discharge port. However, with the provision of the inlet port of this invention, the air flowed into the shroud from the air inlet can adequately compensate for the pump effect reduced as described above, thereby smoothing the discharge of the lubricating oil.

According to the lubricating system of this invention, since the discharge ports are respectively provided to the portions respectively opposed to the mesh point in the shroud across the axes of the two gears, the lubricating oil can be smoothly swirled in such portions at an appropriate flow speed, while the centrifugal force can be applied to the swirled lubricating oil, most effectively, in a discharge direction. Therefore, even in the case in which the discharge port provided in each of the portions has such a relatively small opening area that can control the air resistance, the lubricating oil can be discharged in the preset discharge amount from the discharge port. This can significantly reduce both of the air resistance and resistance associated with stirring the lubricating oil.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE INVENTION

Hereinafter, one preferred embodiment of the present invention will be described, with reference to the drawings.

Figure 1:
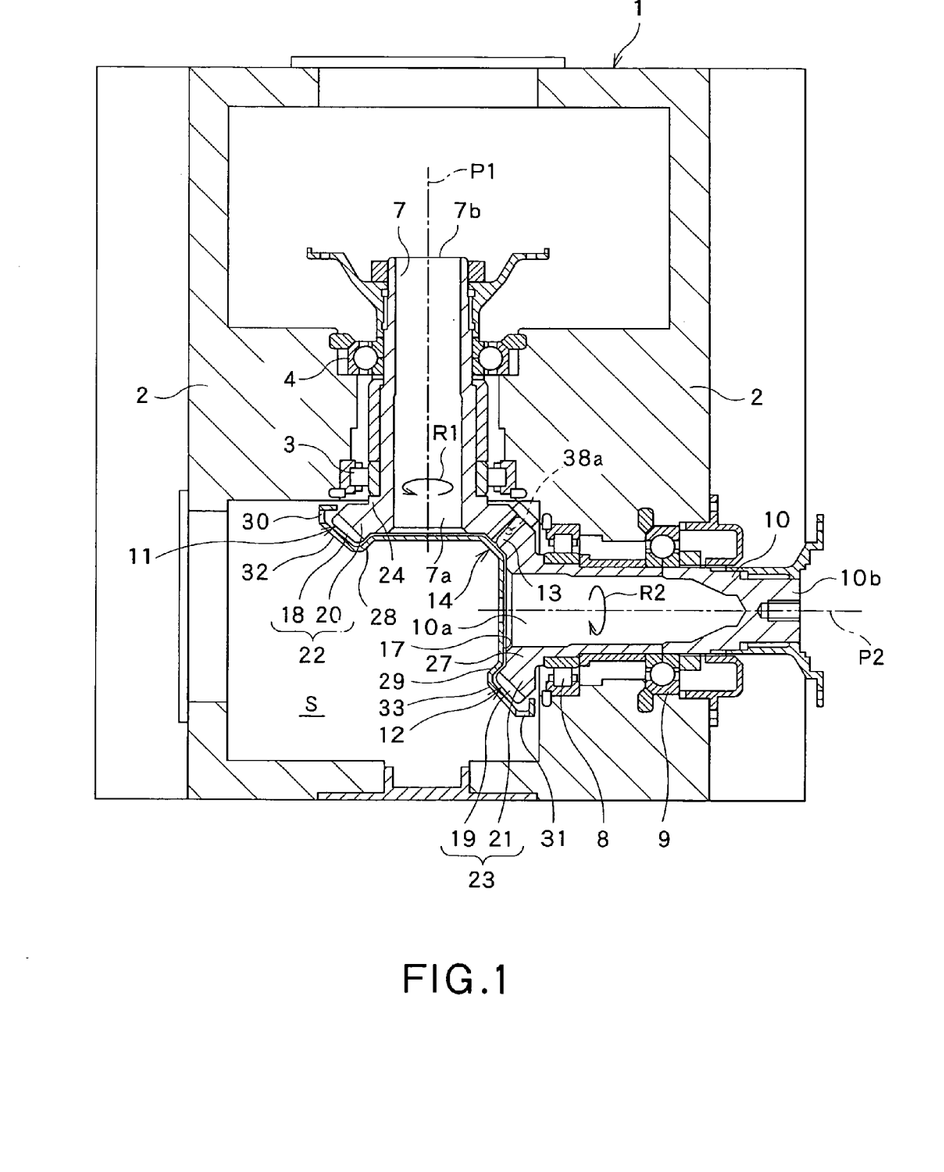
FIG. 1 is a horizontal section showing one exemplary gear unit including the lubricating system for the gear train according to one embodiment of the present invention.

In the horizontal section of FIG. 1, the gear unit includes the lubricating system according to the embodiment of the present invention. In this embodiment, the present invention is applied to a gear box 1 that is one typical example of the gear unit. The gear box 1 includes a bearing housing 2, in which an input shaft 7 is rotatably supported by bearings 3, 4 and an output shaft 10 is rotatably supported by bearings 8, 9, respectively. An axis P1 of the input shaft 7 and an axis P2 of the output shaft 10 lie in the same plane, respectively. Further, in this example, the axes P1 and P2 are orthogonal relative to each other in the same horizontal plane.

To one end 7a of the input shaft 7, an input gear 11 composed of a bevel gear is integrally provided. The input gear 11 is projected toward one side of the bearing housing 2, while facing a gear space S in the gear box 1. The other end 7b of the input shaft 7 is connected with a power source, such as the jet engine or the like, via a mechanical reduction gear (not shown). To one end 10a of the output shaft 10, an output gear 12 also composed of the bevel gear is integrally provided. This output gear 12 is projected toward another side of the bearing housing 2, while facing the gear space S in the gear box 1. The other end 10b of the output shaft 10 is connected with an auxiliary machine, such as a power generator or the like, via another mechanical reduction gear (not shown).

Figure 2:
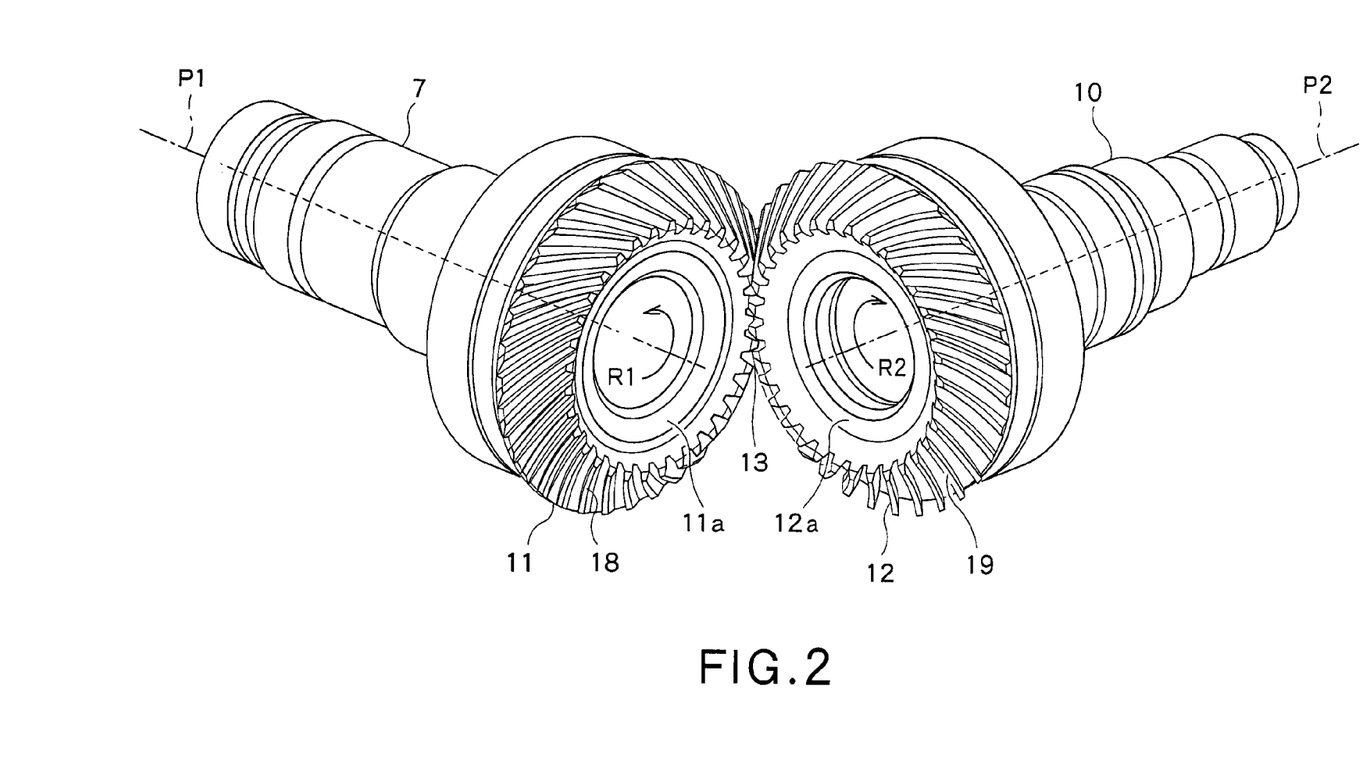
FIG. 2 is a front perspective view showing the gear train of the gear unit shown in FIG. 1.

As shown in FIG. 2, the input gear 11 and output gear 12, both composed of the bevel gears, have the axes P1, P2 that are orthogonal relative to each other in the same horizontal plane, respectively. Further, the input gear 11 and output gear 12 are meshed with each other, while defining a 90° angle therebetween. Accordingly, a mesh point 13 of the two gears 11, 12 is in the horizontal plane including the two axes P1, P2. In this case, the two gears 11, 12 are rotated via the mesh point 13 in directions R1, R2, respectively. Therefore, a position below the mesh point 13 corresponds to a side or region subjected to a gear pump effect of the two gears 11, 12.

Figure 3:
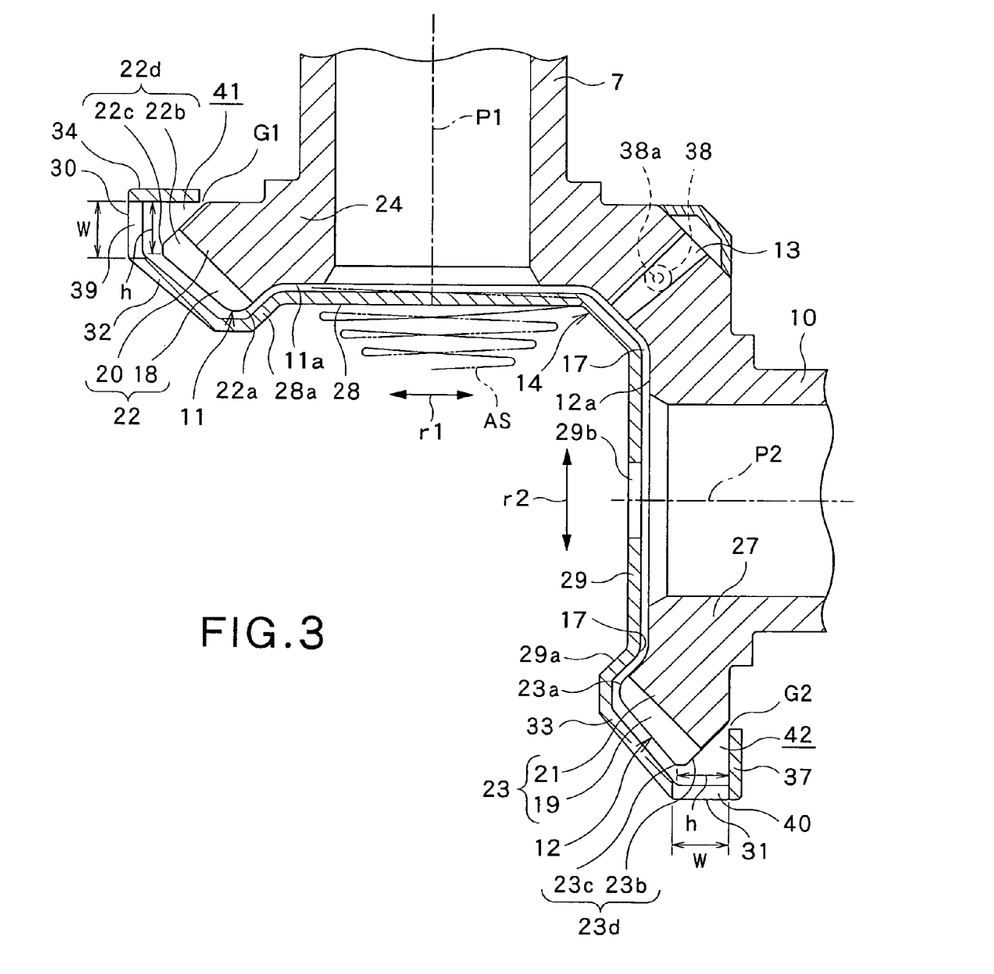
FIG. 3 is an enlarged view of a key portion of FIG. 1.

As shown in FIG. 1, both of the gears 11, 12 are surrounded by a shroud 14 attached to the bearing housing 2 via a plurality of bolts (not shown). In the enlarged view of FIG. 3 schematically showing the shroud 14 and gears 11, 12, the two gears 11, 12 include toothed portions 22, 23 and disks 24, 27, respectively. The toothed portions 22, 23 are integrally formed around outer circumferences of the disks 24, 27, respectively. Further, the toothed portions 22, 23 are composed of teeth 18, 19 respectively constituting the bevel gears and annular rims 20, 21 respectively having the teeth 18, 19 formed thereon, respectively. In this case, front faces 11a, 12a of the two gears 11, 12 respectively facing the outside in the axial directions, i.e., the faces of the two gears 11, 12 respectively opposed to the apexes of imaginary cones defined by the truncated-cone shaped teeth 18, 19 of the disks 24, 27, are formed into flat faces respectively extending in radial directions r1, r2. Further, front end portions 22a, 23a of the toothed portions 22, 23 are projected forward relative to the gear front faces 11a, 12a, respectively. Meanwhile, rear faces of the toothed portions 22, 23 are formed into inclined faces 22b, 23b respectively inclined radially inward as well as axially inward, respectively.

The shroud 14 forms a flow passage 17 in a space provided between the two gears 11, 12. This flow passage 17 serves to supply the lubricating oil into the shroud 14 from a nozzle which will be described later. Specifically, the shroud 14 includes first and second end walls 28, 29 respectively covering the gear front faces 11a, 12a of the two gears 11, 12; first and second partially cylindrical walls 30, 31 respectively covering outer circumferential faces 22d, 23d respectively including maximum diametrical portions 22c, 23c of the toothed portions 22, 23 of the two gears 11, 12, in the radial directions r1, r2 from the outside; first and second partially conical walls 32, 33 respectively covering distal ends of the teeth of the two gears 11, 12, obliquely to the radial directions r1, r2 from the outside; and first and second rear walls 34, 37 respectively extending inward in the radial directions r1, r2 of the two gears 11, 12 from corresponding axial ends of the partially cylindrical walls 30, 31, while covering the respective toothed portions 22, 23 in the radial directions.

To the pair of end walls 28, 29 of the shroud 14, stepped portions 28a, 29a are provided along corresponding inner circumferential faces of the toothed portions 22, 23 of the gears 11, 12, respectively. With this configuration, each gap between the respective end walls 28, 29 and the corresponding gear front faces 11a, 12a can be positively reduced. Further, between the partially cylindrical wall 30 and rear wall 34 and the inclined face 22b of the toothed portion 22 and between the partially cylindrical wall 31 and rear wall 37 and the inclined face 23b of the toothed portion 23, relatively large oil reservoirs 41, 42 are provided, respectively.

Figure 4:
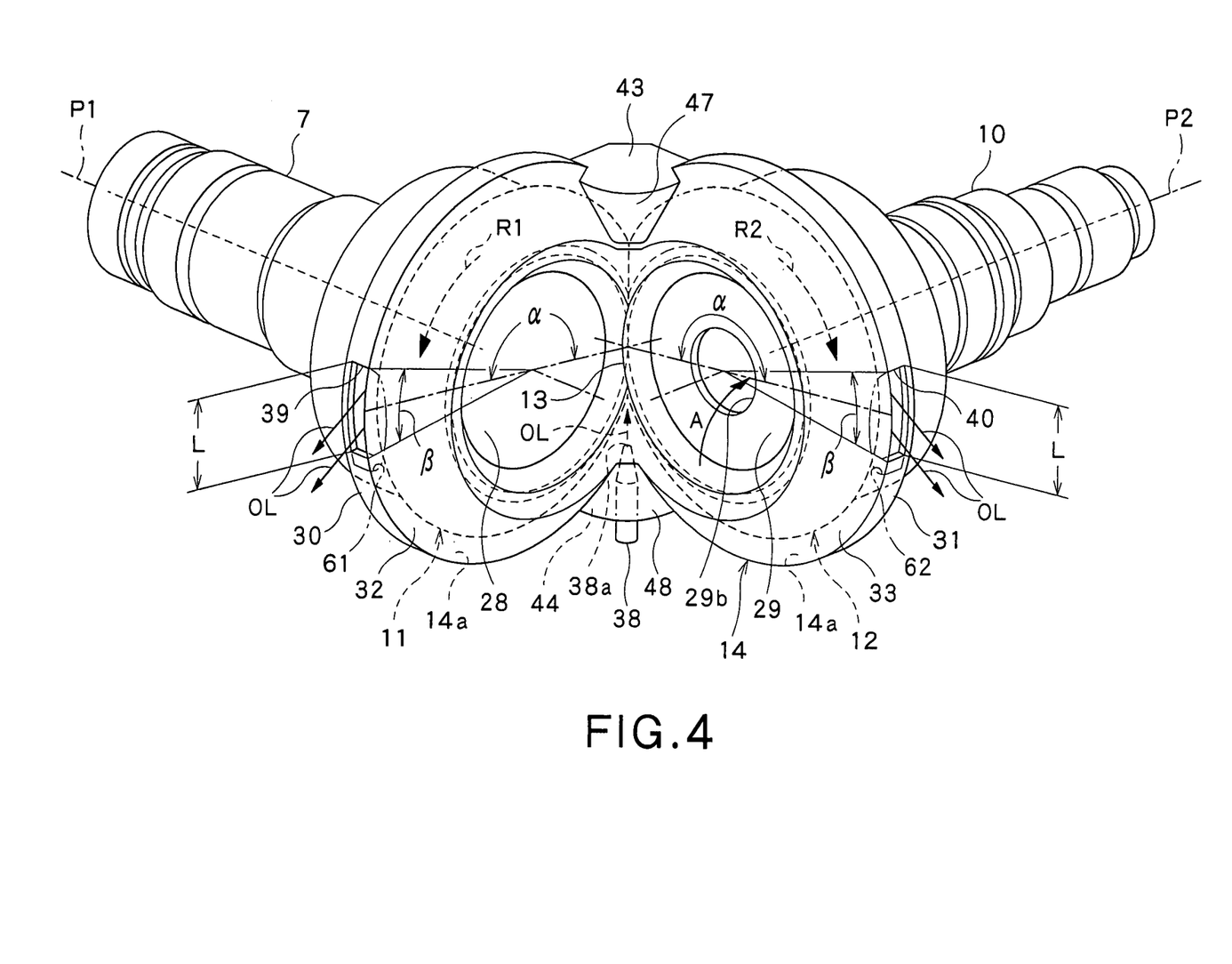
FIG. 4 is a front perspective view showing the lubricating system shown in FIG. 1.

As shown in FIG. 4, the pair of partially cylindrical walls 30, 31, respectively constituting the outer circumference of the shroud 14, are connected with each other via upper and lower non-cylindrical portions 43, 44 respectively covering the mesh point 13 of the two gears 11, 12. Except such connection portions, however, most of each partially cylindrical wall 30, 31 is formed into a cylindrical shape. Similarly, the pair of partially conical walls 32, 33 are connected with each other via non-conical portions 47, 48 respectively covering the mesh point 13 of the two gears 11, 12. Except such connection portions, however, most of each partially conical wall 32, 33 has the truncated-cone-like shape.

Figure 5:
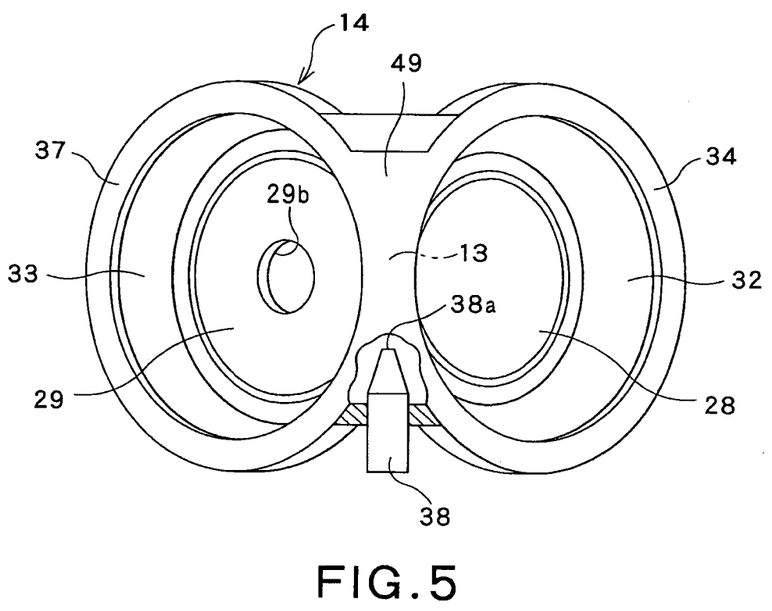
FIG. 5 is a rear perspective view showing the lubricating system shown in FIG. 1.

As shown in the rear perspective view of FIG. 5, the annular rear walls 34, 37 of the shroud 14 are also connected with each other via a non-annular portion 49 covering the mesh point 13 from the back side. In a central portion of the end wall 29 covering the front face of the output gear 12 of the shroud 14 shown in FIG. 4, i.e., in the central portion of the end wall 29 facing the front face of the output gear 12, an inlet port 29b for the air A is formed.

A nozzle 38 adapted for supplying the lubricating oil OL is fixed in a position opposite, from below, to the mesh point 13 of the two gears 11, 12 of the shroud 14, while extending through the shroud 14 vertically upward. Accordingly, a lubricating oil supply port 38a provided at a distal end of the nozzle 38 is located just below the mesh point 13 of the two gears 11, 12. Thus, the nozzle 38 can supply the lubricating oil OL, upwardly from below, toward the mesh point 13. As described above, the position below the mesh point 13 corresponds to the side or region subjected to the gear pump effect that will be determined by the respective rotational directions R1, R2 of the two gears 11, 12. For this reason, the lubricating oil supply port 38a of the nozzle 38 is located just below the mesh point 13.

Additionally, in the shroud 14, as shown in FIG. 4, first and second discharge ports 39, 40 for the lubricating oil OL are provided to portions respectively opposed to the mesh point 13 of the two gears 11, 12 across the axes P1, P2, or formed in positions angularly spaced apart from the mesh point 13 by an angle α of approximately 180° in the rotational directions R1, R2 about the respective axes P1, P2 of the two gears 11, 12, respectively. It is noted that the positions of the discharge ports 39, 40 refer to the central positions, in both of the axial and circumferential directions, of the respective discharge ports 39, 40, respectively. In order to reduce the resistance that will be described later, it is preferred that the angle α is set within a range of 180°±15°, more preferably 180°±10°, and more preferably 180°±5°.

When seen in the corresponding radial direction, each discharge port 39, 40 has a rectangular shape, and is set to have a circumferential length L that corresponds to a circumferential angle β of approximately 30° about each axis P1, P2. Preferably, the circumferential angle β is within a range of 30°±7°, more preferably 30°±5°, and more preferably 30°±3°. Further, as shown in FIG. 3, the width W in the direction of each axis P1, P2 of the discharge ports 39, 40 is set to be substantially coincident with the height h in the direction of each axis P1, P2 of the outer circumferential faces 22d, 23d of the respective toothed portions 22, 23. Preferably, the width W is within a range of 0.9 to 1.1 h.

Figure 6:
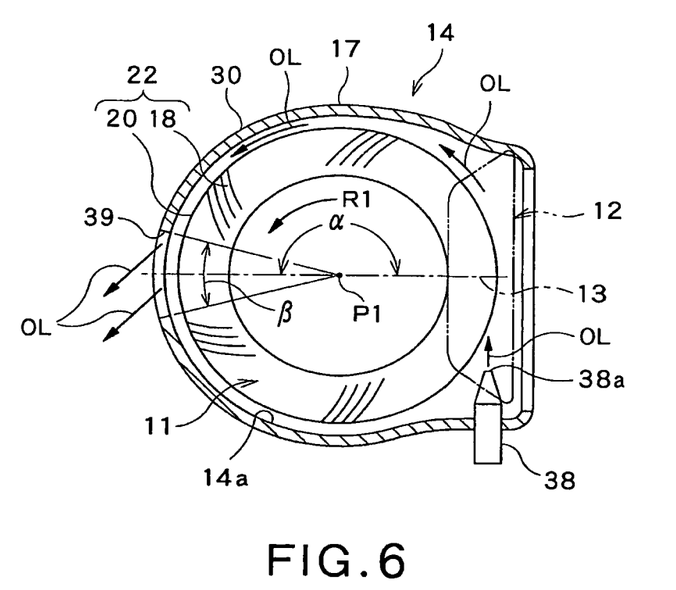
FIG. 6 is a transverse section of the shroud in the lubricating system shown in FIG. 1.

Next, the operation of the lubricating system including the gear train 11, 12 will be described. FIG. 6 shows one typical operation for lubricating the input gear 11. In this case, the lubricating oil OL injected upward from the lubricating oil supply port 38a of the nozzle 38 is supplied to the mesh point 13 of the two gears 11, 12, so that the mesh point 13 can be lubricated with the lubricating oil OL. Then, the lubricating oil OL supplied to the mesh point 13 is flowed upward due to a kind of gear pump effect generated by the rotation of the two gears 11, 12 in the shroud 14. Thereafter, the flow of the lubricating oil OL is bifurcated into two flows toward the two gears 11, 12, while being guided by the shroud 14. In this way, one of such bifurcated oil flows is introduced into an upper portion relative to the input gear 11. Then, the lubricating oil OL is passed through the flow passage 17 between the toothed portion 22 of the input gear 11 and the first partially cylindrical portion 30 of the shroud 14, and discharged to the exterior of the shroud 14 from the first discharge port 39.

In this embodiment, the lubricating oil supply port 38a is located on the side to be subjected to the gear pump effect. Therefore, as compared with the case in which the lubricating oil OL is horizontally injected and supplied toward the mesh point 13 from the front face side of the input gear 11, the lubricating oil OL can be supplied to the input gear 11 more efficiently, in a greater amount, by only adding a low level of discharging pressure to the oil by using a lubricating oil pump (not shown). Thus, the mesh point 13 can be lubricated enough with such efficiently supplied oil. Furthermore, the air is drawn by the centrifugal force into the shroud 14 from a gap G1 between the first rear wall 34 and the inclined face 22b of the toothed portion 22 shown in FIG. 3, and then discharged to the exterior from the first discharge port 39 together with the lubricating oil OL, as shown in FIG. 6.

Additionally, in the shroud 14 of this embodiment, as shown in FIG. 3, the provision of the stepped portion 28a to the first end wall 28 along the inner circumferential face of the toothed portion 22 of the input gear 11 can positively reduce the gap between the first end wall 28 and the gear front face 11a. Therefore, the spiral air flow AS that would be otherwise drawn along the front gear face 11a and then generated on the front face side of the gear face 11a can be effectively controlled. As such, the air resistance caused by the input gear 11 can be positively reduced.

Meanwhile, a swirl flow of the lubricating oil OL in the rotational direction R1 of the input shaft 11 is gradually regulated as it is flowed in the rotational direction R1 from the mesh point 13. In this case, the first discharge port 39 of the shroud 14 is provided in the position angularly spaced apart from the mesh point 13 by the angle α of approximately 180° in the rotational direction R1 about the axis P1 of the input gear 11. Therefore, the lubricating oil OL can be discharged with high efficiency from the first discharge port 39, after the swirl flow of the oil OL is smoothed enough in the shroud 14.

If the first discharge port 39 is formed in a position angularly spaced apart from the mesh point 13 by an angle less than 180°, i.e., the position substantially above the axis P1, the flow of the lubricating oil OL cannot be regulated sufficiently. Thus, the lubricating oil OL cannot be smoothed enough. Contrary, if the first discharge port 39 is formed in a position angularly spaced apart from the mesh point 13 by an angle greater than 180°, i.e., the position substantially below the axis P1, the residence time of the lubricating oil OL in the shroud 14 becomes unduly long, resulting in increase of the resistance associated with stirring the lubricating oil OL in such a residence state by the input gear 11. This causes substantial increase of the loss of power.

In this embodiment, however, since the first discharge port 39 is provided in the position angularly spaced apart from the mesh point 13 by the angle α of approximately 180°, the lubricating oil OL can be discharged from the first discharged port 39, after the flow of the oil OL is sufficiently regulated. Besides, the lubricating oil OL can be swirled at an appropriate speed, while the centrifugal force can be well applied to such swirled lubricating oil OL. Therefore, the lubricating oil OL can be adequately discharged, in the preset amount, from the first discharge port 39, even though the discharge port 39 has such a small opening area that can control the increase of the air resistance caused by the air flowed into the shroud from the discharge port 39. Accordingly, this embodiment can provide an effect for securely reducing both of the air resistance and resistance associated with stirring the lubricating oil.

Further, as shown in FIG. 4, the circumferential length L of the first discharge port 39 is set to be equal to the circumferential angle β of approximately 30° about the axis P1. With the provision of the first discharge port 39 having such a length L, the lubricating oil OL can be discharged with high efficiency in an adequate amount, thereby successfully reducing the loss of power. If the circumferential length L of the first discharge port 39 is shorter than the length equal or corresponding to the circumferential angle β of approximately 30°, the discharge amount of the lubricating oil OL is less than a preset amount thereof, leading to undue residence of the lubricating oil OL in a bottom portion 14a of the shroud 14. Contrary, if the circumferential length L is longer than the length corresponding to the circumferential angle β of approximately 30°, the amount of air introduced into the shroud 14 from the gap G1 between the input shaft 11 and the rear wall 34 of the shroud 14 as shown in FIG. 3 is unduly increased with increase of the discharge amount of the lubricating oil OL from the discharge port 39. This causes the increase of the air resistance.

Additionally, as shown in FIG. 3, the teeth 18 of the input shaft 11 composed of the bevel gear have the truncated-cone-like shape on the whole. Therefore, as shown in FIG. 6, the lubricating oil OL swirled with the rotation of the input shaft 11 is guided toward the toothed portion 22 composed of such truncated-cone-like teeth 18 and rim 20, while being subjected to the centrifugal force for swirling the oil. In addition, the first partially cylindrical wall 30 covers the maximum diametrical portion 22c of the input gear 11 radially from the outside. Namely, this wall 30 is located at a point, to which the centrifugal force for swirling the lubricating oil OL can be applied at the maximum effect. Therefore, the provision of the discharge port 39 to the partially cylindrical wall 30 can effectively utilize the centrifugal force in order to efficiently discharge the lubricating oil OL.

Further, as described above, the width W in the axial direction of the first discharge port 39 shown in FIG. 3 is set to be substantially coincident with the height h in the axial direction of the first partially cylindrical wall 30. Since the height h in the axial direction is also substantially coincident with the width in the axial direction of the oil reservoir 41, the lubricating oil OL accumulated in the oil reservoir 41 can be efficiently discharged from the discharge port 39. Namely, the lubricating oil OL in the oil reservoir 41 is once guided along an inner face of the first partially cylindrical wall 30 subjected to relatively great centrifugal force generated by the rotation of the input shaft 11, and then efficiently discharged from the first discharge port 39 having a relatively large width W substantially coincident with the height h in the axial direction. It is noted that the rear wall 34 of the shroud 14 may be extended to cover the entire rear face of the disk 24 of the input gear 11. In this embodiment, however, the rear wall 34 is designed to have a relatively small size in the radial direction to an extent such that this wall 34 can constitute the oil reservoir 41. It is noted that the shroud 14 has only to have such a size or shape that can cover at least the teeth 18 of the input gear 11. Therefore, the rear wall 34 may be eliminated.

In regard to the output gear 12, the same effect as described above can be obtained. However, the output gear 12 has an outer diameter slightly less than that of the input gear 11. In this case, we have found that the lubricating oil OL is supplied from the nozzle 38 shown in FIG. 4 to the output gear 12 in an amount greater than the amount of the oil supplied to the input gear 11. Thus, an inlet port 29b is provided to the second end wall 29 located in front of the output gear 12 in the shroud 14. With this configuration, the outside air can be introduced into the shroud 14 from the inlet port 29b and mixed with the lubricating oil OL, as shown in FIG. 4, in addition to the air introduced from a gap G2 provided between the rear wall 37 and the inclined face 23b of the toothed portion 23 shown in FIG. 3. Therefore, the flow of the lubricating oil OL can be further smoothed. If such an inlet port 29b is not provided, the efficiency in discharging the lubricating oil OL from the second discharge port 40 would be insufficient. This is because the smaller outer diameter of the output gear 12 lessens so much the centrifugal force generated along the outer circumference thereof, providing the pump effect substantially less than that of the input gear 11, as such rendering the lubricating oil OL unlikely to be flowed along an inner face of the shroud 14. However, if the inlet port 29b is provided to the second end wall 29 of the shroud 14, the air flowed into the shroud 14 via the inlet port 29b can compensate for such lessened pump effect, thereby further smoothing the discharge of the lubricating oil OL. By the way, if the outer diameter of the input gear 11 is smaller than that of the second gear 12, it is preferable to provide the inlet port for the outside air to the end wall 28 located in front of the input gear 11.

Figure 7:
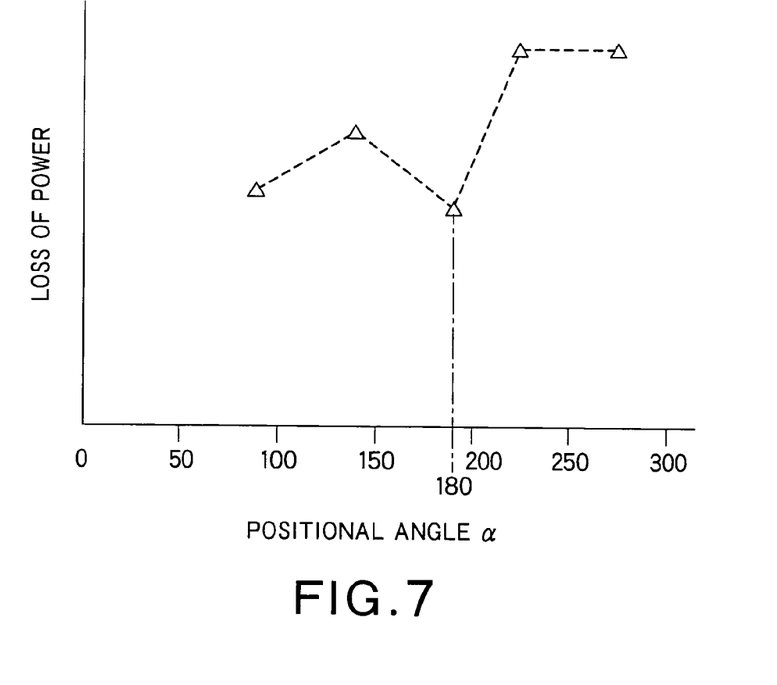
FIG. 7 illustrates an experimental result showing a relationship between the loss of power and an angle at which each discharge port is provided.

FIG. 7 shows one experimental result with respect to the relationship between the loss of power and the angle α at which each discharge port 39, 40 is provided. As shown in FIG. 4, each discharge port 39, 40 has been described as one that is located in the position angularly spaced apart from the mesh point 13 by 180° (i.e., the angle α=180° about the gear axis P1, P2 and is designed to have the circumferential length L corresponding to the circumferential angle of 30° about each axis P1, P2. Namely, as apparently seen from FIG. 7, we have confirmed that the angle α set at 180° can minimize the loss of power, for the above reason. Furthermore, we have found that sufficient reduction of the loss of power can be achieved, provided that the angle α is within the range of 180°±15° (i.e., α=180°±15°, the circumferential length L corresponds to the angular range of 30°±7° (i.e., L=30°±7°, and the width W in each axial direction is within the range of 0.9 to 1.1 h.

Figure 8:
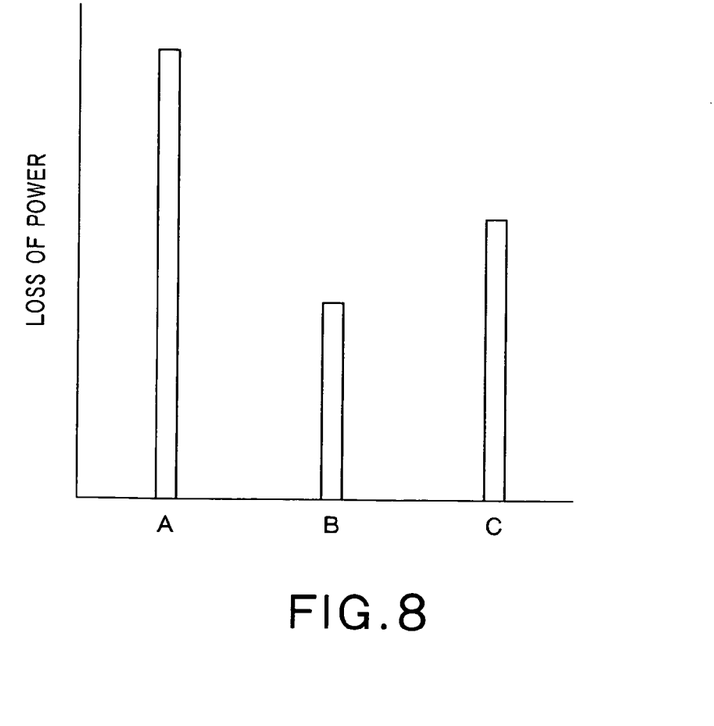
FIG. 8 is another experimental result showing a relationship between the loss of power and each of the lubricating systems respectively related to the embodiment of the present invention and comparative examples.

FIG. 8 is another experimental result showing a difference in the loss of power due to presence or absence of the shroud as well as showing an impact of the shape of each discharge port on the loss of power. In FIG. 8, reference character A designates the lubricating system according to a first comparative example not including the shroud, B designates the lubricating system according to the embodiment described above, and C designates the lubricating system according to a second comparative example. More specifically, in the second comparative example C, relatively large discharge ports 60, 62, each having a U-like shape as shown by two-dot chain lines depicted in the shroud 14 shown in FIG. 4, are provided over the first and second partially cylindrical walls 30, 31 and first and second partially conical walls 32, 33, respectively. As apparently seen from the experimental result shown in FIG. 8, it has been proved that the lubricating system according to the embodiment of this invention, which includes the discharge ports 39, 40 respectively provided to only the first and second partially cylindrical walls 30, 31, can significantly reduce the loss of power.

It should be appreciated that the circumferential length L suitable for the first and second discharge ports 39, 40 respectively shown in FIG. 4 is not limited to the circumferential angle of approximately 30°, but may be altered, depending on the required discharge amount of the lubricating oil.

Other than the gear train composed of the plurality of bevel gears as described and shown in the above embodiment, this invention can also be applied to the gear train composed of a plurality of spur gears or helical gears. Therefore, it should be construed that various addition, alteration and deletion can be made to the above embodiment without departing from the gist of this invention, and hence it should be considered that such addition, alteration and deletion also fall within the scope of this invention.

The invention claimed is:

1. A lubricating system for a gear train comprising:
    a lubricating oil supply port configured to supply a lubricating oil in a direction vertical to both axes of a pair of gears and toward a mesh point at which the pair of gears are meshed with each other;
    a shroud configured to cover at least teeth of the pair of gears so as to form a flow passage of the lubricating oil between the pair of gears and the shroud; and
    a pair of discharge ports respectively configured to discharge the lubricating oil from the flow passage, the pair of discharge ports respectively being positioned at two portions of the shroud, one of the two portions being located opposed to the mesh point with respect to one of the respective axes of the pair of gears, and the other of the two portions being located opposed to the mesh point with respect to the other of the respective axes of the pair of gears.

2. The lubricating system for the gear train according to claim 1,
    wherein the pair of gears are bevel gears, and wherein the pair of discharge ports are respectively located in two positions respectively opposite to a pair of toothed portions of the pair of bevel gears in radially outward directions, each of the toothed portions including the teeth of each of the bevel gears and an annular rim of each of the bevel gears on which the teeth are formed.

3. The lubricating system for the gear train according to claim 2, wherein the shroud includes a pair of end walls respectively covering a pair of front faces of the pair of gears, a pair of partially cylindrical walls respectively covering a pair of outer circumferential faces of the pair of toothed portions from radially outsides, and a pair of partially conical walls respectively covering distal ends of the teeth from obliquely radially outsides, and wherein the pair of discharge ports are respectively formed in the pair of partially cylindrical walls.

4. The lubricating system for the gear train according to claim 3, wherein a width of each of the pair of discharge ports in an axial direction of each corresponding gear is substantially coincident with a height in the axial direction of each of the pair of partially cylindrical walls.

5. The lubricating system for the gear train according to claim 1, wherein the pair of gears have horizontal axes, respectively, and the lubricating oil is supplied upward from below toward the mesh point.

6. The lubricating system for the gear train according to claim 1, wherein each of the pair of discharge ports is located in a position angularly spaced apart from the mesh point by approximately 180° about an axis of each corresponding gear, and a circumferential length of each of the pair of discharge ports corresponds to a circumferential angle of approximately 30° about the axis of each corresponding gear.

7. The lubricating system for the gear train according to claim 1, wherein the shroud includes a pair of end walls respectively covering a pair of front faces of the pair of gears, and an inlet port for introducing an outside air into the shroud is formed in one of the pair of end walls at a position opposite to the front face of one gear having an outer diameter smaller than an outer diameter of an other gear.

* * * * *